July 3, 1928.
W. L. MARTIN
1,675,615
CONTROL MECHANISM
Filed Jan. 17, 1924
3 Sheets-Sheet 2
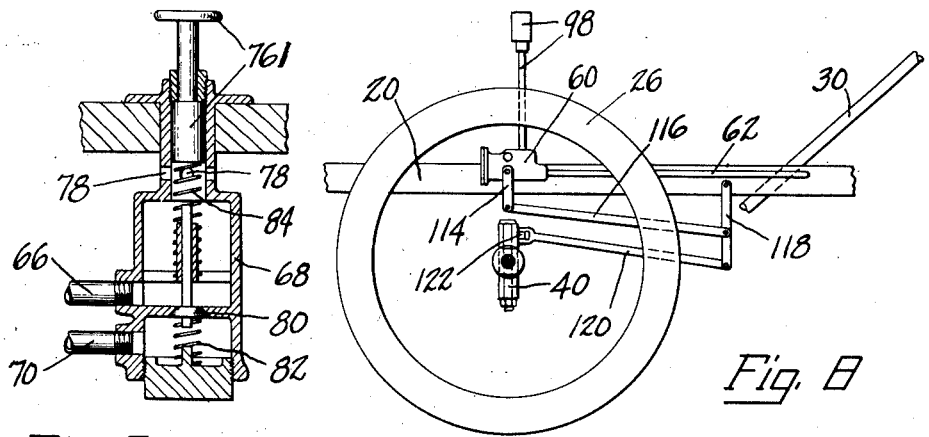
Fig. 6
Fig. 8
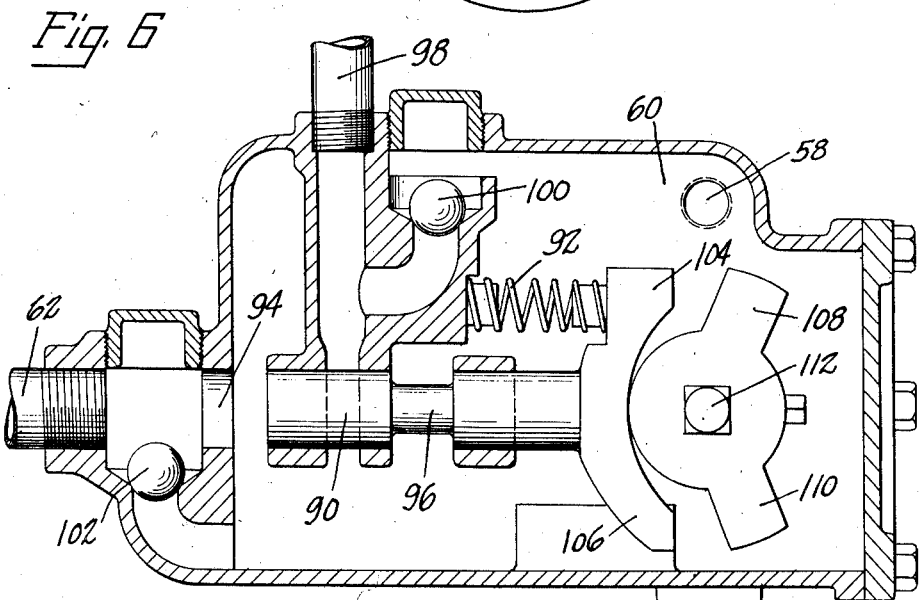
Fig. 7
Inventor
William Lincoln Martin
By his Attorneys July 3, 1928.  
W. L. MARTIN  
CONTROL MECHANISM  
Filed Jan. 17, 1924  
1,675,615  
3 Sheets-Sheet 3
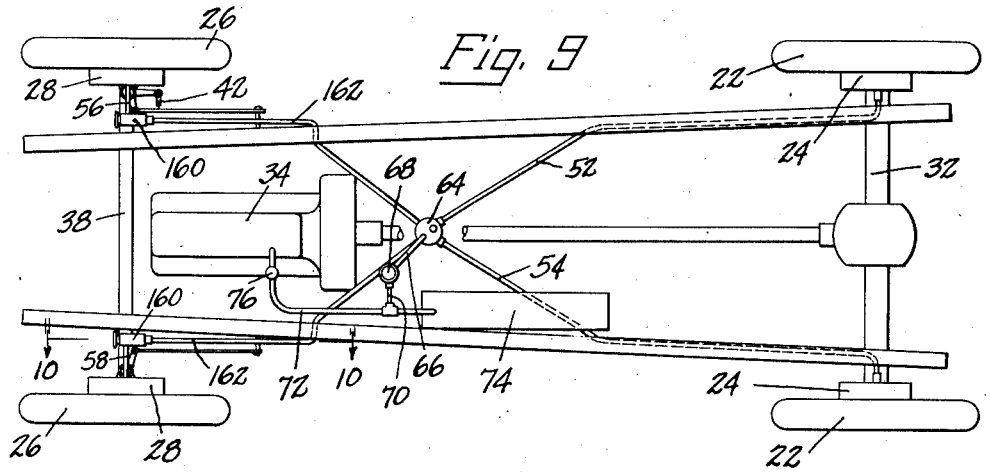
Fig. 9
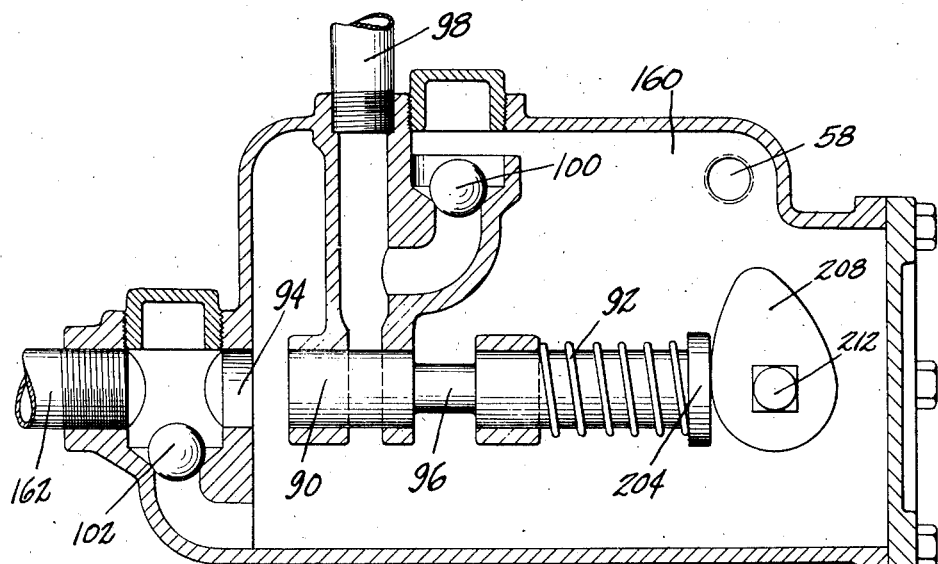
Fig. 10
Inventor  
William Lincoln Martin  
By his Attorneys  
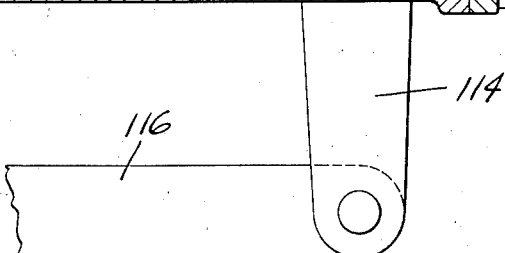

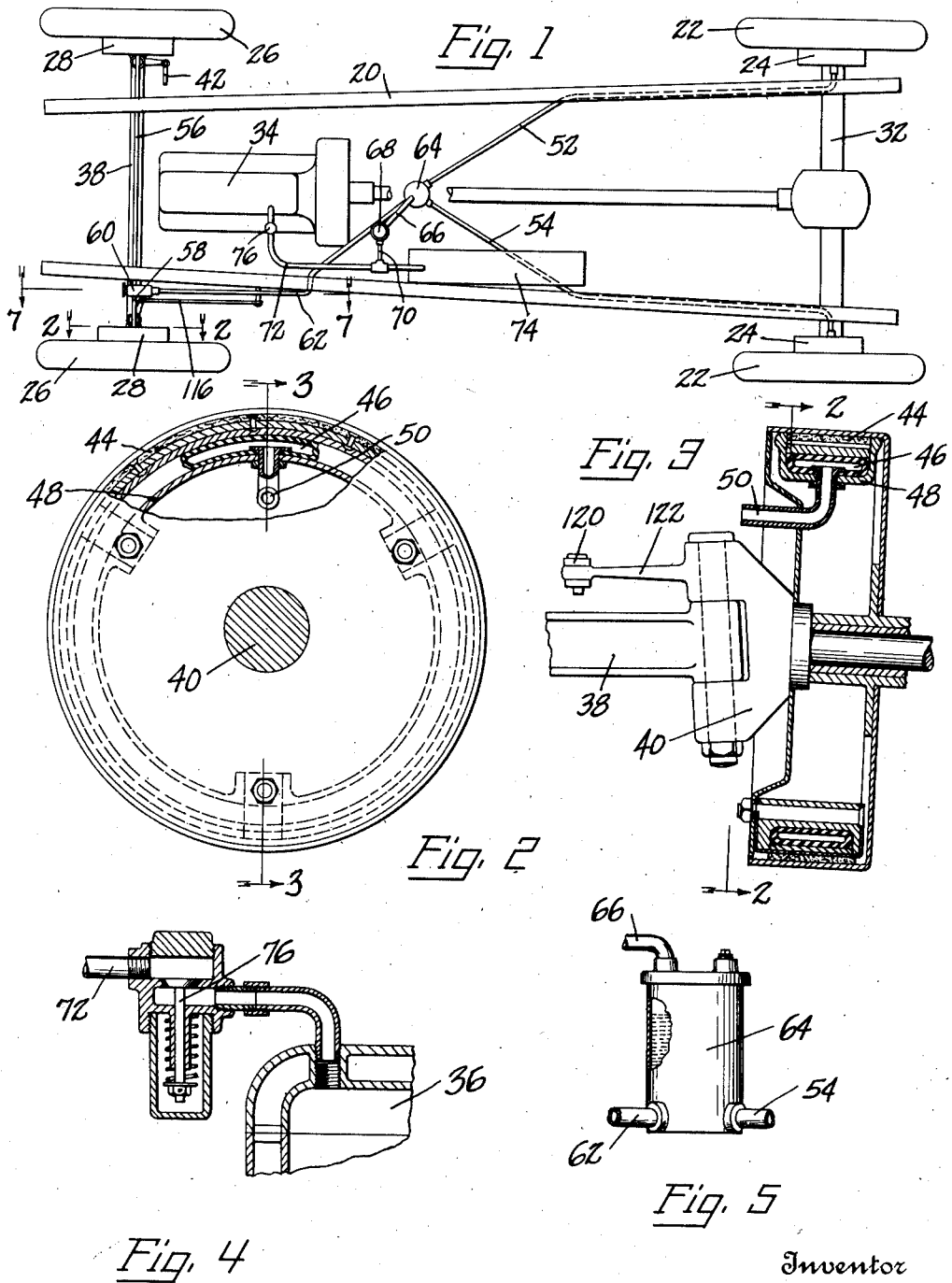

Patented July 3, 1928.

1,675,615

UNITED STATES PATENT OFFICE.

WILLIAM LINCOLN MARTIN, OF DETROIT, MICHIGAN, ASSIGNOR TO GENERAL MOTORS CORPORATION, OF DETROIT, MICHIGAN, A CORPORATION OF DELAWARE.

CONTROL MECHANISM.

Application filed January 17, 1924. Serial No. 686,936.

This invention relates to vehicles, and is illustrated as embodied in an automobile having brakes operated by hydraulic or other fluid pressure.

An object of the invention is to give the driver control of the pressure on one or more brakes, or other control devices, independently of the others, e. g. so that the pressure may be relieved or otherwise varied to prevent skidding the corresponding wheels.

In one desirable arrangement, means is provided whereby the driver can relieve or otherwise vary the pressure on one of several sets of fluid-operated brakes, for example, by operating a valve to relieve pressure on one or both front brakes while maintaining the pressure on the rear brakes. Preferably, the valve is controlled by steering movement of the front dirigible wheels, in such a manner as either to relieve both brakes, or the one on the outside of the turn, thus making absolutely certain that the wheels will not lock on a turn, with resultant loss of steering control.

Another feature of the invention relates to varying the pressure on the brakes, whether the brakes are operated by mechanical or fluid connections, when the wheels are turned beyond a predetermined minimum angle, as in rounding a corner, without varying the pressure when the wheels are turned within this angle, as in the ordinary steering movements on the straightway. This may be done by providing a lost-motion connection for operating the above-described valve.

The above and other objects and features of the invention, including various novel combinations of parts and desirable particular constructions, will be apparent from the following description of two illustrative embodiments shown in the accompanying drawings, in which Fig. 1 is a plan view of an automobile chassis embodying a system of brakes such as described above;

Fig. 2 is a section on the lines 2—2 of Figs. 1 and 3, showing parts of one of the front brakes in side elevation and parts in vertical longitudinal section;

Fig. 3 is a section on the line 3—3 of Fig. 2, showing the brake in transverse vertical section;

Fig. 4 is a vertical section through part of one of the engine cylinders, showing the check valve which controls the flow of compressed gases therefrom;

Fig. 5 is a side elevation, partly broken away, of the reservoir in which driver-controlled gas pressure is applied to a liquid which transmits the pressure to the brakes;

Fig. 6 is a vertical section through one form of valve which may be provided for operation by the driver to apply the brakes;

Fig. 7 is a vertical section on the line 7—7 of Fig. 1 through the valve which controls the above-described variation in the pressure on the brakes, and which is shown as operated by steering movement of the dirigible front wheels;

Fig. 8 is a diagrammatic side elevation of one front wheel, showing the means for operating the valve of Fig. 7;

Fig. 9 is a plan view corresponding to Fig. 1, showing a chassis in which the front brakes are separately controlled in turning a corner, in such a manner as to relieve the pressure on the outer brake without affecting the inner brake; and Fig. 10 is a vertical section corresponding to Fig. 7, but showing one of the valves of Fig. 9.

In Figs. 1–8, the invention is shown embodied in an automobile having a chassis frame 20, rear wheels 22 with brakes 24, and dirigible front wheels 26 with brakes 28, the front wheels being controlled by steering mechanism including the usual steering column 30. The frame 20 is supported by springs carried by a rear drive axle 32 operated by an engine 34, one cylinder of which is shown at 36 in Fig. 4, and by a front axle 38 swiveled at opposite ends to the knuckles 40 of front wheels 26, the knuckles having the usual steering arms connected by a drag link 42. The brakes shown in the drawings are intended to be operated by hydraulic or other fluid pressure, and comprise shoes 44 forced against the brake drums by inflatable annular tubes, or inner tubes, 46 confined by fixed channels 48, the fluid under pressure communicating with the tubes through leads 50. Conduits 52 and 54 connect to the leads 50 for the rear brakes; and flexible conduits 56 and 58 for the front brakes lead from a valve casing 60 connected to a conduit 62 through which pressure is applied to both front brakes.

I prefer to use as the operating fluid a non-compressible, non-freezing liquid, such as oil, or a mixture of water with alcohol or glycerine, in the above-described conduits, to which pressure may be applied by means of compressed gas controlled by a driver-operated valve, or in any other desired manner. In the arrangement illustrated, the conduits radiate from a central reservoir 64 which is normally nearly full of liquid, and which is connected by a conduit 66 with a driver-operated valve 68 which is in turn connected by a conduit 70 with a conduit 72 leading from the engine 34 to a compressed gas reservoir 74. Gas is supplied to the reservoir 74 through the conduit 72 from the engine cylinder 36 through a check valve 76.

Application of the brakes is controlled by the driver through valve 68 shown in Fig. 6, This valve includes a plunger 761 which, when depressed, first cuts off exhaust ports 78, and then depresses a valve 80 against the resistance of its spring 82, to place conduits 70 and 66 in communication with each other, to permit the gas pressure from reservoir 74 to act on the liquid in reservoir 64, and therefore on the brakes. Plunger 761 is normally held in elevated or idle position by a spring 84.

It will be seen that manipulation of valve 68 or its equivalent by the driver controls the brakes, and that the pressure on the four brakes is absolutely and automatically equalized, thus minimizing the danger of skidding. It is desirable, however, to provide an additional safeguard in steering around corners, which will make it impossible at that time to lock both front wheels no matter how much pressure is applied on the brakes, inasmuch as locking the wheels at such a time would inevitably result in loss of steering control, the locked wheels sliding in the direction of the momentum of the car no matter how the steering mechanism is manipulated.

For this purpose the valve 60 is provided to control the pressure in conduits 56 and 58, preferably without affecting the pressure in the remaining conduits. This valve includes a plunger 90, movable axially against the resistance of its spring 92 to shut off the opening 94 from the pressure conduit 62, and provided with an annular passage or groove 96 which connects the valve chamber (and therefore conduits 56 and 58) to a standpipe 98, so that the fluid may rise in the standpipe and relieve the pressure. When the brakes are released, fluid from standpipe 98 may return to the valve chamber through a check valve 100, and fluid from the valve chamber may return to conduit 62 through a check valve 102, when the brakes are released by permitting the plunger 761 to rise, regardless of the position of plunger 90.

Plunger 90 has a head with two arms 104 and 106, one or the other of which is engaged to move the plunger whenever the vehicle goes around a corner, by one or the other of two cam arms 108 and 110 on a shaft 112 rocked by an arm 114. This arm is connected by a link 116 to an idler arm 118 adjacent the rear end of the front spring (so that the action of the springs will not affect the brakes), this arm in turn being connected by a link 120 to an arm 122 on the kunckle 40 for the corresponding front wheel 26. Thus turning of the wheels, and therefore arm 122, operates through links 120 and 116 to operate the valve. It will be noted, however, that there is a substantial lost-motion before the pressure is cut off, so that ordinary slight steering movements when driving straight ahead do not affect the brakes, whereas turning a corner will automatically relieve pressure on the brakes. So far as I am aware, I am the first to suggest the use of means leaving the brakes unaffected by steering movement within a predetermined minimum angle, while varying the pressure when this angle is exceeded, in a braking system of any character, and it is my intention to claim this detail broadly, as well as to claim the particular cam device shown.

In the arrangement shown in Figs. 9 and 10, instead of cutting out both brakes on a turn, only the brake on the outer side of the turn is relieved. This arrangement differs from that described above in that there is a conduit 162 for each front wheel, instead of a single conduit 62, and each conduit 162 is connected to its brake by a valve 160 shown in Fig. 10. In this valve, the plunger 90 has a head 204 engaged by a single cam 208 on a shaft 212 rocked by the arm 114, as described above, when the wheels are turned to round a corner. Cam 208 has a short substantially cylindrical surface, to provide the desired lost-motion, or a surface so nearly cylindrical that the movement of plunger 90 before it reaches opening 94 will provide sufficient lost-motion. After this lost-motion, the cam 208 on the outer side of the turn will relieve the pressure on its brake, as explained above, whereas the cam 208 on the inner side of the turn will merely turn idly without operating its plunger 90.

The above-described arrangement, as compared with prior means for releasing the outer brake on a turn, has the advantage that the two front brakes are normally perfectly equalized, the differential braking action being called into play only when actually needed, whereas existing constructions cannot be used if any type of equalizing medium is provided. I regard this as an important minor feature of my invention, and intend to claim it broadly as applied to any system of brakes.

As explained above, while two illustrative

17. A vehicle comprising, in combination, a dirigible wheel, a controlling device therefor, a fluid conduit for transmitting pressure to said device, means for applying pressure to fluid in the conduit, and a valve controlling the pressure in the conduit, the valve having an operating cam turned by steering movement of the wheel.

18. A vehicle comprising, in combination, a dirigible wheel, a controlling device therefor, a fluid conduit for transmitting pressure to said device, a valve connected to the conduit having a member movable to cut off pressure from the conduit and relieve pressure in the conduit, and connections for moving said member which are operated by steering movement of the wheel.

19. A vehicle comprising, in combination, a dirigible wheel, a controlling device therefor, a fluid conduit for transmitting pressure to said device, a valve casing connected to the conduit and provided with a side passage, a member movable in the casing to shut off pressure and to connect the side passage with the conduit leading to the controlling device, and connections for moving said member which are operated by steering movement of the wheel.

20. A valve comprising, in combination, a casing having an inlet and an outlet and a side passage, a plunger movable to close the inlet and having an annular groove to connect the side passage with the outlet, and a cam for operating the plunger.

21. A vehicle comprising, in combination, dirigible wheels, brakes therefor, and means operated by steering movement of the wheels beyond a predetermined minimum angle to vary the pressure on the brakes, the pressure being unaffected by steering movement of the wheels within said minimum angle.

22. A vehicle comprising, in combination, dirigible wheels, brakes therefor, means for applying the brakes, and a device unaffected by steering movement of the wheels within a predetermined minimum angle which varies the pressure on the brakes when the wheels are turned beyond said minimum angle.

23. A vehicle comprising, in combination, dirigible wheels, brakes therefor, means for applying the brakes, and a device unaffected by steering movement of the wheels within a predetermined minimum angle which relieves the pressure on one of the brakes when the wheels are turned beyond said minimum angle.

24. A vehicle comprising, in combination, dirigible wheels, brakes therefor, fluid-pressure connections for applying the brakes, and a device for varying the pressure in said connections when the wheels are turned beyond a predetermined minimum angle without affecting the pressure when the wheels are turned within said angle.

25. A vehicle comprising, in combination, dirigible wheels, brakes therefor, fluid conduits for transmitting pressure to the brakes, a valve for varying the pressure in the conduits, and a connection operated by turning the wheels beyond a predetermined minimum angle which operates the valve but which does not operate the valve to affect the fluid pressure when the wheels are turned within said minimum angle.

26. A vehicle comprising, in combination, dirigible wheels, brakes therefor, fluid conduits for transmitting pressure to the brakes, a valve for relieving the pressure in the conduit for the outer brake, and a connection operated by turning the wheels beyond a predetermined minimum angle which operates the valve but which does not operate the valve to affect the fluid pressure when the wheels are turned within said minimum angle.

27. A vehicle comprising, in combination, dirigible wheels, brakes therefor, fluid conduits for transmitting pressure to the brakes, a valve controlling the pressure on the fluid in the conduits, and lost-motion connections operated by turning the wheels and arranged to operate the valve.

28. A vehicle having, in combination, a pair of dirigible wheels, brakes therefor, means for turning the wheels to steer the vehicle, means to apply the brakes equally when the vehicle is moving straight ahead, and means to vary the pressure on one brake in turning a corner without affecting the pressure on the other brake.

29. A vehicle having, in combination, a pair of dirigible wheels, brakes therefor, means for turning the wheels to steer the vehicle, and means to apply the brakes equally when the vehicle is moving straight ahead and to relieve the pressure on one brake in turning a corner without affecting the pressure on the other brake.

30. A vehicle having, in combination, a pair of dirigible wheels, brakes therefor, steering mechanism, brake-applying means, and means operated by steering movement of the wheels by said mechanism which automatically relieves pressure on the outer brake if the brakes are applied, without affecting pressure on the inner brake.

31. A vehicle having, in combination, a pair of dirigible wheels, brakes therefor, steering mechanism, means for applying the brakes equally when the vehicle is moving straight ahead, and steering means for turning the wheels to round a corner and to relieve pressure on the outer brake without affecting the inner brake.

32. A vehicle having, in combination, a pair of dirigible wheels, brakes therefor, steering mechanism, conduits for applying the brakes by fluid pressure, and means automatically operated when the wheels are embodiments of my invention have been described in detail, it is not my intention to limit its scope to those particular embodiments, or otherwise than by the terms of the appended claims. Moreover, while described as controlling a set of brakes, certain features are capable of other use, and it is not my intention to limit the claims on such features to the operation of brakes only. The term "brake" in the claims is used as a convenient designation including retarding means of all sorts, the "outer" brake being the one on the outside of the turn and the "inner" brake the one on the inside.

I claim:

1. A vehicle comprising, in combination, dirigible wheels having brakes, fluid means for operating the brakes, and means operated by turning the wheels to vary the action of said fluid means.

2. A vehicle comprising, in combination, dirigible wheels, brakes for the wheels, fluid-operated connections for operating the brakes, and a valve controlled by steering movement of the wheels and varying the effect of the connections on the brakes.

3. A vehicle comprising, in combination, dirigible wheels having brakes, fluid means for operating the brakes, and a device operated by turning the wheels to relieve the pressure on the outer brake.

4. A vehicle comprising, in combination, dirigible wheels having brakes, fluid means for operating the brakes, and a device operated by turning the wheels to differentiate the pressure on the two brakes.

5. A vehicle comprising, in combination, dirigible wheels, brakes for the wheels, a conduit for fluid transmitting operating pressure to the brakes, and a pressure-varying valve controlling the pressure of fluid in the conduit and controlled by the angular position of the wheels.

6. A vehicle comprising, in combination, a pair of dirigible wheels having brakes, a conduit for transmitting fluid under pressure to each brake, a valve connected to each conduit and arranged to control the fluid pressure therein, and means operated by turning the wheels to actuate one of the valves.

7. A vehicle comprising, in combination, a pair of dirigible wheels having brakes, a conduit for transmitting fluid under pressure to each brake, a valve connected to each conduit and arranged to control the fluid pressure therein, and means operated by turning the wheels to cause the valve for the outer brake to relieve the pressure thereon.

8. A vehicle having a dirigible wheel and a plurality of brakes, one brake being associated with the dirigible wheel, and comprising, in combination, conduits for transmitting fluid pressure to the various brakes, and a valve operated by turning movement of the dirigible wheel to relieve the pressure in the conduit for its brake while maintaining the pressure in the other conduits.

9. A vehicle having rear and dirigible front wheels and a brake for each wheel, and comprising, in combination, a separate conduit for transmitting fluid pressure to each brake, and a valve controlled by steering movement of the front wheels to vary the pressure in the outside front brake conduit while maintaining the pressure in the other conduits.

10. A vehicle comprising, in combination, a dirigible wheel, a brake therefor, a conduit to transmit fluid pressure to the brake, and a valve operated by steering movement of the wheel to vary the pressure in the conduit.

11. A vehicle comprising, in combination, a dirigible wheel, a brake therefor, a conduit to transmit fluid pressure to the brake, and a valve operated by steering movement of the wheel to relieve the pressure in the conduit.

12. A vehicle comprising, in combination, a dirigible wheel, a fluid brake therefor, a conduit flexibly connected to the brake and transmitting fluid pressure thereto, and a valve operated by steering movement of the wheel to relieve the pressure in the conduit between the valve and the brake.

13. A vehicle comprising, in combination, a dirigible wheel, a brake therefor, a conduit transmitting fluid pressure to the brake, and a valve interposed in the conduit at an intermediate point and operated by steering movement of the wheel to vary the pressure in the conduit on the side of the valve toward the brake while maintaining the pressure in the conduit on the opposite side of the valve.

14. A vehicle comprising, in combination, a dirigible wheel, a brake therefor, a conduit transmitting fluid pressure to the brake, means to apply pressure to fluid in the conduit, a normally closed side pressure-relieving passage, and a valve operated by steering movement of the wheel and interposed in the conduit at an intermediate point in such a manner as to close the conduit on the side toward the pressure-applying means and to connect the side passage and the conduit leading to the brake.

15. A vehicle having brakes as defined by claim 14, and which also has an auxiliary check valve to return fluid from the side passage to the conduit when the pressure is relieved, regardless of the position of the steering-operated valve.

16. A vehicle comprising, in combination, a dirigible wheel, a controlling device therefor, a fluid conduit for transmitting pressure to said device, means for applying pressure to fluid in the conduit, and a valve controlling the pressure in the conduit, the valve having an operating arm rocked by steering movement of the wheel.

turned by the steering mechanism and which varies the pressure in the conduit for one of the brakes without affecting the pressure in the conduit for the other brake.

33. A vehicle having, in combination, a pair of dirigible wheels, a brake for each wheel, steering mechanism, means for applying automatically equalized pressure to the two brakes on the straightway, and means automatically operated when the wheels are turned by the steering mechanism and which varies the pressure on the brakes.

34. A vehicle having, in combination, a pair of dirigible wheels, a brake for each wheel, steering mechanism, means for applying automatically equalized pressure to the two brakes on the straightway, and means automatically operated when the wheels are turned by the steering mechanism and which varies the pressure on one of the brakes without affecting the other.

35. A vehicle having, in combination, a pair of dirigible wheels, a brake for each wheel, steering mechanism, means for applying automatically equalized pressure to the two brakes on the straightway, and means automatically operated when the wheels are turned by the steering mechanism and which relieves the pressure on the brake on the outside of the turn.

36. In a vehicle brake mechanism, the combination with the steering wheels of a vehicle, of liquid operated brake appliances respectively associated with said wheels, steering mechanism for said wheels, and means controlled by said steering mechanism restraining the brake apliances from effective control when the wheels are turned at a predetermined angle for steering.

37. In a vehicle brake mechanism, the combination with a vehicle wheel swivelled for steering purposes, of a fluid operated brake appliance associated with said wheel, and means restraining said appliance from effective control of the brake upon a predetermined swivel movement of the wheel.

38. In a vehicle brake mechanism, the combination with a vehicle wheel swivelled for steering purposes, of a fluid operable brake appliance associated with said wheel, a valve controlling the delivery of fluid to said appliance, and means for automatically closing said valve upon a predetermined swivel actuation of the wheel.

39. In a vehicle brake mechanism, the combination with a vehicle wheel swivelled for steering purposes, of a fluid operated brake appliance associated with said wheel, and means for automatically relieving the fluid pressure in said appliance upon a predetermined swivel movement of said wheel.

40. In a vehicle brake mechanism, the combination with a vehicle wheel swivelled for steering purposes, of a fluid operable brake appliance associated with said wheel, a fluid supply pipe leading to said appliance, a relief passage associated with said pipe, a valve normally closing communication between said pipe and relief passage, and means for opening said valve upon a predetermined steering movement of said wheel.

41. In a vehicle brake mechanism, the combination with a vehicle wheel swivelled for steering purposes, of a fluid operable brake appliance associated with said wheel, a fluid delivery pipe leading to said appliance, a valve chamber connected in said pipe, a valve in said chamber controlling the flow through said pipe, a relief passage communicating with said chamber and likewise controlled by said valve, and a control mechanism for said valve actuable by the steering mechanism of said wheel.

42. In a vehicle brake mechanism, the combination with a vehicle wheel swivelled for steering purposes, of a fluid operable brake appliance associated with said wheel, a pipe for the delivery of fluid to said appliance, a relief passage connected with said pipe, and a check valve controlling the return flow from said relief passage.

43. In a vehicle brake, the combination with means for applying the brakes by fluid pressure at each front wheel of the vehicle, of means controlled by the turning of the front wheels for preventing an application of the brakes at one of the front wheels.

44. In a vehicle brake, the combination with means for applying the brakes by fluid pressure at each front wheel of the vehicle, of means controlled by the turning of the front wheels for controlling communication through which fluid under pressure is supplied to apply the brakes.

45. In a vehicle brake, the combination with means for applying the brakes by fluid under pressure at each front wheel of the vehicle, of means operated upon turning the front wheels to a predetermined extent for closing communication through which fluid under pressure is supplied to apply the brakes at one of the front wheels.

46. In a vehicle brake, the combination with means for applying the brakes by fluid under pressure at each front wheel of the vehicle, of means operated upon turning the front wheels to a predetermined extent for releasing the fluid pressure brake at one of the front wheels.

47. In a vehicle brake, the combination with means for applying the brakes by fluid under pressure at each front wheel of the vehicle, of means operated upon turning the front wheels to a predetermined extent for releasing the fluid pressure brake at the front wheel taking the outside of the curve.

48. In a vehicle brake, the combination with means for applying the brakes by fluid under pressure at each front wheel of the vehicle, of means operated upon turning a curve for automatically releasing the fluid pressure brake at the front wheel taking the outside of the curve.

49. In a vehicle brake, the combination with means for applying the brakes by fluid under pressure at each front wheel of the vehicle, of means operated upon turning the front wheels to a predetermined extent for cutting off communication through which fluid is supplied to apply the brakes at one of the front wheels and upon turning the front wheels to a further extent for releasing the brake at said front wheel.

50. In a vehicle brake, the combination with means for applying the brakes by fluid under pressure at each front wheel of the vehicle, of means for automatically releasing the fluid pressure brake at the front wheel taking the outside of the curve upon turning a curve.

51. In a vehicle brake, the combination with means for applying the brakes by fluid under pressure at all four wheels of the vehicle, of means operated upon turning a curve for preventing an application of the brakes at one of the front wheels while the brakes are applied at the other three wheels of the vehicle.

52. In a vehicle brake, the combination with means for applying the brakes by fluid under pressure at all four wheels of the vehicle, of means operated upon turning a curve for releasing the brake at one of the front wheels while the brakes remain applied on the other three wheels of the vehicle.

53. In a vehicle brake, the combination with means for applying the brakes by fluid under pressure at all four wheels of the vehicle, of means operated upon turning a curve for releasing the brake at one of the front wheels of the vehicle and for re-applying the brake at said front wheel when a straight road is resumed.

54. In a vehicle brake, the combination with a valve device for controlling the supply of fluid under pressure for applying the brakes at each of the front wheels of the vehicle, of a valve operated by the turning of the front wheels for controlling communication through which fluid under pressure is supplied by said valve device.

55. In a vehicle brake, the combination with a valve device for controlling the supply of fluid under pressure for applying the brakes at each of the front wheels of the vehicle, of a steering rod connecting the front wheels of the vehicle and a valve operatively connected to said rod for controlling communication through which said valve device supplies fluid under pressure to apply the brakes.

56. In a vehicle brake, the combination with a valve device for controlling the supply of fluid under pressure for applying the brakes at each of the front wheels of the vehicle, of a steering rod connecting the front wheels of the vehicle and a valve operatively connected to said rod and operable by said rod when the front wheels are turned for cutting off communication through which fluid is supplied by said valve device to apply the brakes at one of the front wheels.

57. In a vehicle brake, the combination with means for applying the brakes at each of the front wheels of the vehicle, of valve means operated upon turning the front wheels for cutting off communication through which fluid is supplied to apply the brakes of one of the front wheels and means for releasing the brakes at said front wheel regardless of the position of said valve means.

58. In a vehicle brake mechanism and in combination with a vehicle wheel swivelled for steering purposes, a fluid operable brake appliance associated with said wheel; a normally open valve for controlling the supply of fluid to said appliance; means for closing said valve upon a predetermined swivel movement of said wheel; and means acting simultaneously with the said valve closing means for relieving the fluid pressure in said appliance.

59. In brake mechanism for vehicles having dirigible front wheels, and fluid actuated brakes associated with said wheels; a conduit through which fluid is supplied under pressure to one of said brakes to actuate the same; a normally open valve for controlling the flow through said conduit; means operable from and in unison with the steering mechanism of the vehicle, and acting upon a predetermined angular movement of the front wheels from their position for straight ahead movement of the vehicle, for causing the closing of said valve; and means acting simultaneously with said valve closing means for increasing the total volume of said conduit, to thereby reduce the pressure therein.

In testimony whereof I affix my signature.

WILLIAM LINCOLN MARTIN.